US011356713B2

(12) United States Patent
Chang et al.

(10) Patent No.: US 11,356,713 B2
(45) Date of Patent: *Jun. 7, 2022

(54) LIVE INTERACTIVE VIDEO STREAMING USING ONE OR MORE CAMERA DEVICES

(71) Applicant: Twitter, Inc., San Francisco, CA (US)

(72) Inventors: Wayne Chang, Boston, MA (US); Suyash Sonwalkar, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,943

(22) Filed: Jan. 15, 2019

(65) Prior Publication Data

US 2019/0149851 A1    May 16, 2019

Related U.S. Application Data

(63) Continuation of application No. 15/355,782, filed on Nov. 18, 2016, now Pat. No. 10,219,009.

(51) Int. Cl.
*H04N 7/173* (2011.01)
*H04N 21/2187* (2011.01)
(Continued)

(52) U.S. Cl.
CPC ..... *H04N 21/2187* (2013.01); *H04L 65/4076* (2013.01); *H04L 67/42* (2013.01);
(Continued)

(58) Field of Classification Search
CPC ............... H04N 21/44; H04N 21/2668; H04N 21/47202; H04N 21/4788; H04N 21/816; H04N 21/2365; H04N 21/47
(Continued)

(56) References Cited

U.S. PATENT DOCUMENTS 8,214,862 B1    7/2012 Lee et al.
8,817,065 B1    8/2014 Mo
(Continued)

FOREIGN PATENT DOCUMENTS

EP    2490179 A1    8/2012

OTHER PUBLICATIONS

International Search Report and Written Opinion for International Application No. PCT/US2017/061287, dated Mar. 12, 2018, 18 pages.

(Continued)

*Primary Examiner* — Jivka A Rabovianski
(74) *Attorney, Agent, or Firm* — Brake Hughes Bellermann LLP

(57) ABSTRACT

A computing device is configured to execute an interactive streaming application, and the interactive streaming application configured to join a live broadcast of an event that is shared by an interactive video broadcasting service executing on a server computer, receive a first video stream having video captured from a camera device configured as a first video source and display the video on a display screen, receive a second video stream having panoramic video captured from a panoramic video capturing device configured as a second video source and display a portion of the panoramic video according to a first viewing angle on the display screen, receive a change to the first viewing angle of the panoramic video, and display another portion of the panoramic video according to a second viewing angle.

16 Claims, 8 Drawing Sheets

(51) Int. Cl.

| | |
|---|---|
| *H04N 21/218* | (2011.01) |
| *H04N 21/4788* | (2011.01) |
| *H04N 21/81* | (2011.01) |
| *H04N 5/232* | (2006.01) |
| *H04L 65/611* | (2022.01) |
| *H04L 67/01* | (2022.01) |
| *H04N 21/238* | (2011.01) |
| *H04W 84/04* | (2009.01) |
| *H04W 84/12* | (2009.01) |

(52) U.S. Cl.
CPC ..... *H04N 5/23238* (2013.01); *H04N 5/23293* (2013.01); *H04N 5/232061* (2018.08); *H04N 21/21805* (2013.01); *H04N 21/238* (2013.01); *H04N 21/4788* (2013.01); *H04N 21/816* (2013.01); *H04W 84/042* (2013.01); *H04W 84/12* (2013.01)

(58) Field of Classification Search
USPC .......................................... 725/116, 61, 109
See application file for complete search history.

(56) References Cited

U.S. PATENT DOCUMENTS

| | | | |
|---|---|---|---|
| 8,875,208 | B1 | 10/2014 | Abkairov et al. |
| 9,620,168 | B1 | 4/2017 | Townsend et al. |
| 2002/0144273 | A1 | 10/2002 | Reto |
| 2003/0026588 | A1 | 2/2003 | Elder et al. |
| 2009/0148124 | A1 | 6/2009 | Athsani et al. |
| 2011/0225515 | A1 | 9/2011 | Goldman et al. |
| 2012/0236031 | A1 | 9/2012 | Haddick et al. |
| 2013/0282446 | A1* | 10/2013 | Dobell ............. G06Q 10/06398 705/7.42 |
| 2013/0312041 | A1* | 11/2013 | Gresta ................ H04N 7/173 18 725/61 |
| 2013/0347046 | A1 | 12/2013 | Bluvband et al. |
| 2014/0007147 | A1 | 1/2014 | Anderson |
| 2014/0137144 | A1 | 5/2014 | Järvenpää et al. |
| 2014/0186004 | A1 | 7/2014 | Hamer |
| 2014/0215512 | A1 | 7/2014 | Maruyama et al. |
| 2015/0015690 | A1 | 1/2015 | Roh et al. |
| 2015/0058709 | A1 | 2/2015 | Zaletel et al. |
| 2015/0295879 | A1* | 10/2015 | Jung ....................... H04L 51/32 709/204 |
| 2016/0057457 | A1 | 2/2016 | Clements et al. |
| 2016/0073013 | A1* | 3/2016 | Prosserman ........... H04N 5/247 348/588 |
| 2016/0277328 | A1 | 9/2016 | Ishizuka |
| 2016/0286244 | A1 | 9/2016 | Chang et al. |
| 2016/0381109 | A1 | 12/2016 | Barnett et al. |
| 2016/0381110 | A1* | 12/2016 | Barnett ................. H04L 65/601 709/231 |
| 2017/0208362 | A1 | 7/2017 | Flores et al. |
| 2017/0272491 | A1 | 9/2017 | Ortiz et al. |
| 2018/0217589 | A1 | 8/2018 | Kim |

OTHER PUBLICATIONS

Invitation to Pay Additional Fees and Partial International Search for International Application PCT/US2017/061287, dated Jan. 17, 2018, 8 pages.
International Search Report and Written Opinion for PCT Application No. PCT/US2017/014830, dated May 10, 2017, 21 pages.
Aguilar, "You Can Now Livestream from a GoPro Using Your iPhone", retrieved on Apr. 12, 2017 from http://gizmodo.com/you-can-now-livestream-from-a-gopro-1642963184, Oct. 6, 2014, 13 pages.
Anonymous, "Easy Guide to the Periscope Video Streaming App", Oct. 7, 2015, 10 pages.
Anonymous, "How to Broadcast a Live Video Feed From Your Phone or Tablet | PCWorld", retrieved on Apr. 12, 2017 from http://www.pcworld.com/article/242633/how_to_broadcast_a_live_video_feed_from_your_phone_or_tablet.html, Oct. 26, 2011, 6 pages.
Anonymous, "How to use nanoStream for Live Streaming from Parrot Drones", nanocosmos blog, retrieved on Apr. 12, 2017 from https://www.nanocosmos.de/blog/2015/05/how-to-use-nanostream-for-live-streaming-from-drones, May 28, 2015, 5 pages.
Anonymous, "nanoStream Live Video Encoder on the App Store", retrieved on Apr. 13, 2017 from https://itunes.apple.com/us/app/nanostream-live-video-encoder/id821832862?mt=8, Jan. 8, 2016, 3 pages.
Anonymous, "nanoStream Live Video Player App and SDK released", nanocosmos blog, retrieved on Apr. 13, 2017 from https://www.nanocosmos.de/blog/2016/01/nanostream-live-video-player-app-and-sdk-released/#more-2153, Jan. 12, 2016, 6 pages.
Anonymous, "Phantom 3—standard—user manual v1.2", retrieved on Apr. 12, 2017 from http://dl.djicdn.com/downloads/phantom_3_standard/en/Phantom_3_Standard_User_Manual_v1.2_en.pdf, Sep. 30, 2015, 55 pages.
Anonymous, "Why is Periscope Video Fee on Andriod so Low Quality?", Nov. 11, 2015, 2 pages.
Burns, "Stream Live Video From a GoPro With Livestream's Latest iOS App", TechCrunch, retrieved on Apr. 12, 2017 from https://techcrunch.com/2014/10/06/stream-live-video-from-a-gopro-with-livestreams-latest-ios-app/, Oct. 6, 2014, 7 pages.
Cheng, "Advanced: Live Aerial Video Streaming / Aerial Videography Using Drones / Peachpit", retrieved on Apr. 12, 2017 from http://www.peachpit.com/articles/article.aspx?p=2454872&seqNum=6, Nov. 26, 2015, 3 pages.
Hines, "Meerkat or Periscope? How to Broadcast Video via Mobile", Apr. 15, 2015, 20 pages.
Recolive, "Recolive MultiCam dans l' App Store", retrieved on Apr. 13, 2017 from https://itunes.apple.com/fr/app/recolive-multicam/id576184759?mt=8&ign-mpt=uo=4, Oct. 13, 2015, 4 pages.
Solsman, "Livestream Livens up Go Pro with broadcasting in real time", retrieved on Apr. 12, 2017 from https://www.cnet.com/livestream-livens-up-gopro-with-web-broadcasting-in-real-time/, Oct. 6, 2014, 6 pages.
Communication pursuant to Rule 164(2)(b) and Article 94(3) EPC for European Application No. 17804411.1, dated Jul. 2, 2021, 9 pages.

* cited by examiner

┌─────────────────────────────┐
│ Join a live broadcast of an event that is │
│ shared by an interactive video │
│ broadcasting service executing on a │
│ server computer │
│ 602 │
└─────────────────────────────┘
            ↓
┌─────────────────────────────┐
│ Receive a first video stream having video │
│ captured from a camera device │
│ configured as a first video source, and │
│ display the video on a display screen │
│ 604 │
└─────────────────────────────┘
            ↓
┌─────────────────────────────┐
│ Receive a second video stream having │
│ panoramic video captured from a │
│ panoramic video capturing device │
│ configured as a second video source, and │
│ display a portion of the panoramic video │
│ according to a first viewing angle on the │
│ display screen │
│ 606 │
└─────────────────────────────┘
            ↓
┌─────────────────────────────┐
│ Receive a change to the first viewing │
│ angle │
│ 608 │
└─────────────────────────────┘
            ↓
┌─────────────────────────────┐
│ Display another portion of the panoramic │
│ video to a second viewing angle, the │
│ second viewing angle providing a different │
│ perspective of the video stream than what │
│ was provided by the first viewing angle │
│ 610 │
└─────────────────────────────┘

LIVE INTERACTIVE VIDEO STREAMING USING ONE OR MORE CAMERA DEVICES

CROSS-REFERENCE TO RELATED APPLICATION

This application is a continuation of, and claims priority to, U.S. application Ser. No. 15/355,782, filed on Nov. 18, 2016, entitled "LIVE INTERACTIVE VIDEO STREAMING USING ONE OR MORE CAMERA DEVICES", the disclosure of which is incorporated herein in its entirety.

BACKGROUND

An interactive video broadcasting service may allow a broadcasting device to share a live broadcast with a plurality of viewing devices in a social medial platform, and the viewing devices may view and interactive with the live broadcast stream. Typically, the broadcaster controls how the underlying event is captured by controlling the positioning of the camera on the broadcasting device, and this perspective is shared with the viewing devices that joined the broadcast. In some instances, it may be beneficial to provide a more interactive, multi-perspective experience to the viewing devices, but incorporating additional camera devices with enhanced video/audio source selection and control within an interactive video broadcasting service can be challenging.

SUMMARY

In some implementations, a computing device is configured to execute an interactive streaming application, and the interactive streaming application configured to join a live broadcast of an event that is shared by an interactive video broadcasting service executing on a server computer, receive a first video stream having video captured from a camera device configured as a first video source and display the video on a display screen, receive a second video stream having panoramic video captured from a panoramic video capturing device configured as a second video source and display a portion of the panoramic video according to a first viewing angle on the display screen, receive a change to the first viewing angle of the panoramic video, and display another portion of the panoramic video according to a second viewing angle, where the second viewing angle provides a different perspective of the panoramic video than what was provided by the first viewing angle.

In some implementations, the interactive streaming application may include any one or more of the following features (or any combination thereof). The panoramic video may include 360-degree video data. The panoramic video capturing device may include a 360-degree camera mounted device. The interactive streaming application may be configured to receive an indication of a physical orientation of the computing device, and switch to the second viewing angle based on the indication. The interactive streaming application may be configured to receive a selection from a user interface of the interactive streaming application, and switch to the second viewing angle based on the selection. The interactive streaming application may be configured to receive a third video stream having video captured from another camera device configured as a third video source, and display the video from the third video source on the display screen. The interactive streaming application may be configured to switch between displays of the first, second, and third video streams during the course of the event. The interactive streaming application may be configured to provide a multi-source display by concurrently providing the video from the camera device and the panoramic video from the panoramic video capturing device in separate areas of the display screen. The panoramic video capturing device may be a body-equipped 360-degree fly camera. The interactive streaming application may be configured to initiate display of a plurality of icons with the first video stream, where each icon represents a signal of appreciation from one of a plurality of viewers of the first video stream during the live broadcast, and the icon is associated with a respective time in the video stream, and initiate removal of icons from the display screen when a predetermined interval elapses after the respective times. The interactive streaming application may be configured to receive a selection of a replay of the first video stream, where the replay includes one or more video clips that capture past key activities of the event, and initiate play back of the replay.

In some implementations, a system includes an interactive video broadcasting service configured to receive, over a network, a live broadcast of an event having video captured from a camera device configured as a first video source for the event, and panoramic video captured from a panoramic video capturing device configured to a second video source for the event, stream, over the network, the video to a plurality of viewing devices that joined the live broadcast, stream, over the network, a first slice of the panoramic video to the plurality of viewing devices, change a viewing angle of the panoramic video, and stream, over the network, a second slice of the panoramic video to the plurality of viewing devices.

In some implementations, the interactive video broadcasting service may include any one or more of the above/below features (or any combination thereof). The panoramic video may include 360-degree video data. The interactive video broadcasting service may be configured to generate a replay of the live broadcast, where the replay includes one or more video clips that capture past key activities of the event, and provide access to the replay such that the replay can be selected to view the past key activities of the event. The video broadcasting service may be configured to receive a plurality of engagements from a viewing device of the plurality of viewing devices, generate a new indication for each of the plurality of engagements, associate each of the plurality of engagements with a respective time, where the respective times are distinct but may overlap, and add new indications to the video or the panoramic video so that a plurality of graphic representations are displayed during the live broadcast or during subsequent playback of the live broadcast at the respective times to users of the plurality of viewing devices.

In some implementations, a method for sharing video within interactive video broadcasting service includes receiving, over a network, a live broadcast of an event having video captured from a camera device configured as a first video source for the event, and panoramic video captured from a panoramic video capturing device configured to a second video source for the event, streaming, over the network, the video to a plurality of viewing devices that joined the live broadcast, streaming, over the network, a first slice of the panoramic video to the plurality of viewing devices, changing a viewing angle of the panoramic video, and streaming, over the network, a second slice of the panoramic video to the plurality of viewing devices.

In some implementations, the method may include any one or more of the above/below features (or any combination thereof). The method may include generating a replay of the live broadcast, where the replay includes one or more video clips that capture past key activities of the event, and providing access to the replay such that the replay can be selected to view the past key activities of the event. The method may include receiving a plurality of engagements from a viewing device of the plurality of viewing devices, generating a new indication for each of the plurality of engagements, associating each of the plurality of engagements with a respective time, where the respective times are distinct but may overlap, and adding new indications to the video or the panoramic video so that a plurality of graphic representations are displayed during the live broadcast or during subsequent playback of the live broadcast at the respective times to users of the plurality of viewing devices. The panoramic video capturing device may be a body-equipped 360-degree fly camera.

BRIEF DESCRIPTION OF DRAWINGS

FIG. 6 illustrates a flow chart illustrating a method depicting example operations of the various systems disclosed herein according to an implementation.

DETAILED DISCLOSURE

Figure 1:
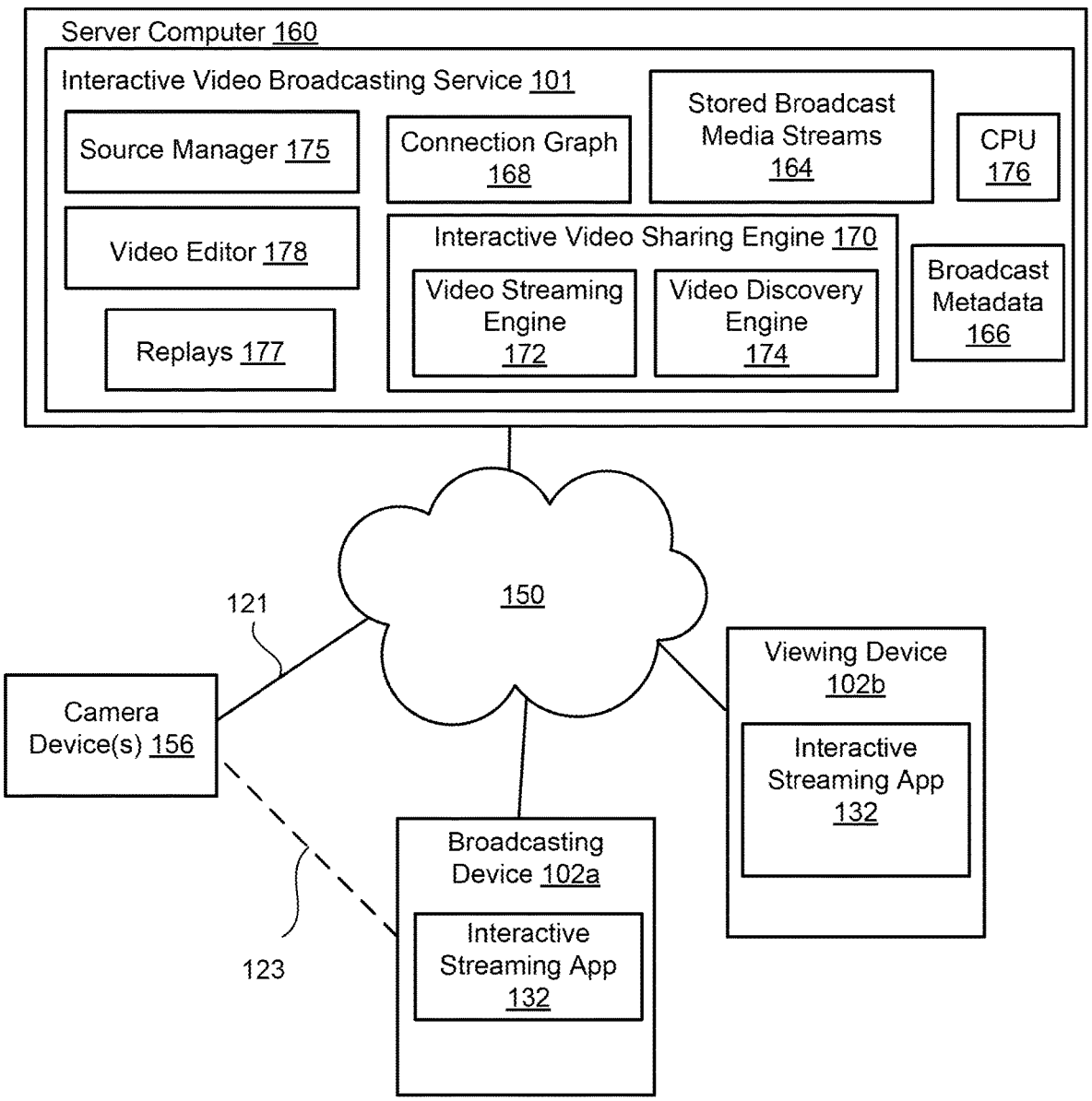
FIG. 1 is a schematic diagram of a system configured to support an interactive video broadcasting service executing on a server computer and an interactive streaming application configured to communicate with the interactive video broadcasting service over a network according to an implementation.

An interactive video broadcasting service may allow a broadcasting device to share a live broadcast with a plurality of viewing devices in a social medial platform, and the viewing devices may view and interactive with the live broadcast stream. In some examples, an interactive video broadcasting service may operate in conjunction with one or more camera devices including a panoramic video capturing device capable of capturing panoramic video surrounding the camera. The panoramic video capturing device may be a 360-degree fly camera configured to capture 360-degree video data, i.e., immersive video or spherical video, where a view in every direction is recorded at the same time, shot using an omnidirectional camera or a collection of cameras. The camera devices may be equipped with application programming interfaces (APIs) or software development kits (SDKs) that enables the camera devices to communicate with the interactive video broadcasting service and/or the broadcasting device over a network.

A viewer can adjust the displayed view of the panoramic video during the live broadcast to pan around the panoramic video. For example, a viewing device that joins the live feed broadcast may receive the panoramic video (or a slice thereof), and the viewing device may display a portion of that panoramic video. Then, the viewer can adjust the various views of the panoramic video to explore the full scope of the panoramic video. In some examples, the viewing device may receive the full panoramic video, but the viewing device may derive a slice of the panoramic video and display that slice of video on its display. When a viewer changes the viewing angle of the panoramic video to incorporate off-screen video into its display (e.g., panning to the left, right, up, or down), the viewing device derives another slice of the panoramic video that corresponds to the new viewing angle. In other examples, the viewing device that joins the live feed broadcast may receive a slice of the panoramic video (e.g., not the full panoramic video) that corresponds to a particular viewing angle, and then may receive other slices in response to the viewer's panning selections. As such, the viewing device displays a portion of that panoramic video at a particular time, but can allow the user to change the viewing angle so that the user can explore the full scope of the panoramic video.

In some examples, the viewing device may include internal sensors (e.g., gyroscope), where the user can manipulate a physical orientation of his/her device (e.g., tilt to the right/left/forward/backwards, etc.) to pan around the panoramic video. In other examples, the user can manipulate a control on the viewing device's user interface in order to pan around the panoramic video. In response, the viewing device may receive (or derive) another portion of the panoramic video that corresponds to the new view of the panoramic video. As such, each viewing device that joins the live broadcast may independently control the panning of the panoramic video, and can explore the full scope of the panoramic video.

In other examples, the view of the panoramic video is centrally controlled by the broadcaster, which may be a producer of the event. For example, the producer may select different video/audio sources for the live feed video stream during the course of the event, and, if one of the video sources is the panoramic video capturing device, the producer may control the displayed view of the panoramic video. As such, the producer controls which content to provide to the viewing devices during the live broadcast. In other examples, the video source selection and viewing angle control are shared or divided among the broadcaster (or the producer) and the viewing devices. For example, the interactive broadcasting service may operate in conjunction with multiple camera devices that can independently connect and communicate with the server. The interactive broadcasting service may provide a first video stream associated with the producer's account (or producer's computer), and the video source for the first video stream may be changed during the live broadcast by only the producer (e.g., switching from a moving camera device to a drone-equipped camera device). In some examples, the interactive broadcasting service may concurrently provide a second video stream to the viewing devices, and the video source selection and/or the viewing angle control may be independently controlled by the viewing devices. For example, the second video stream may be associated with the panoramic video capturing device, and the display of the second video stream may be located in an area separate from the first video stream. Each viewing device may independently control the viewing angle of the panoramic video. In other examples, each viewing device may independently control the video source selection by selecting a certain camera device among a plurality of camera devices as the video source for the second video stream.

In some examples, the underlying event may be a sporting event such as a football game, and the interactive video broadcasting service may capture the underlying event with multiple camera devices configured to communicate with the interactive video broadcasting service. The multiple camera devices may be one or more camera devices connected to suspension cables that may move in accordance with the player's position on the field, one or more stationary cameras, one or more drone-equipped cameras, one or more cameras on a mobile computing device (e.g., smartphone, tablet, etc.), and/or one or more person-mounted cameras (e.g., helmet-equipped camera, body-equipped camera). The multiple camera devices may include one or more of the panoramic video capturing devices, e.g., the 360-degree fly camera. In some examples, the panoramic video capturing device may be mounted to a player's helmet (e.g., a quarterback's helmet). Each of the viewing devices may independently switch among the plurality of camera devices in order to view the sporting event from different perspectives. In the case where the panoramic video capturing device is mounted on the quarterback's helmet, the user may operate the viewing device to change the viewing angle (e.g., panning to left, right, up, or down) in order to get a broader perspective of what the quarterback sees during the beginning of a play or as the play is unfolding. In other examples, the timing, video/audio source selection, and/or viewing angle of panoramic video may be centrally controlled from a producer's computing device associated with the football game.

FIG. 1 is a schematic diagram of a system 100 configured to support an interactive video broadcasting service 101 executing on a server computer 160 according to an implementation. The server computer 160 may be a single computing device, or may be a representation of two or more distributed computing devices communicatively connected to share workload and resources. In some examples, the server computer 160 is a social media platform server. The server computer 160 may also include one or more processors 176 formed in a substrate configured to execute instructions. The instructions may be stored in memory, such as RAM, flash, cache, disk, tape, etc. In addition, the server computer 160 may include one or more data stores configured to store data in a persisting manner.

The interactive video broadcasting service 101 may be configured to communicate with a plurality of devices over a network 150 in order to share video broadcasting streams. For example, the interactive video broadcasting service 101 may communicate with a plurality of broadcasting devices (one of which is illustrated as broadcasting device 102a) and a plurality of viewing devices (one of which is illustrated as viewing device 102b).

The broadcasting device 102a and the viewing device 102b may be any type of network-enabled computing device capable of supporting an interactive streaming application 132. In some examples, the interactive streaming application 132 may be a mobile application, or a browser-based application. In some examples, the broadcasting device 102a and/or the viewing device 102b may be mobile computing devices (e.g., a smart phone, a PDA, a tablet, a wearable device, such as a wrist or head mounted device, a virtual reality device, a laptop computer, a drone equipped camera, etc.), or a non-mobile personal computing device (e.g., a desktop computing device, internet-enabled television or entertainment system).

The broadcasting device 102a may include a camera configured to capture the video broadcasting stream (e.g., live stream video). In other examples, the broadcasting device 102a is associated with, or wirelessly connected to, one or more camera devices 156. For instance, instead of using the broadcasting device's internal camera as the video/audio source, the camera device 156 captures the live video stream and transfers the video stream to the broadcasting device 102a via wireless communication link 123. Then, the video stream is uploaded the interactive video broadcasting service 101 via the network 150 to be shared with the viewing devices 102b. The wireless communication link 12 may include a set of communication protocols that enable the camera device 156 and the broadcasting device 102a to communicate with each other such as near-field communication (NFC), Bluetooth, Wi-Fi, mobile network, etc. In other examples, the interactive video broadcasting service 101 directly receives the video broadcast stream from one or more camera devices 156 via wireless communication link 121, and shares the video broadcast stream with the viewing devices 102b. For instance, the video broadcast stream is not routed to the server computer 160 through the broadcasting device 102a, but rather the camera device 156 communicates directly with the interactive video broadcasting service 101 via wireless communication link 121. The wireless communication link 121 may be a communication link over the network 150 that allows the camera device 156 to communicate directly with the interactive video broadcasting service 101 at the server computer 160 (e.g., Internet-based such as Wi-Fi, mobile network, etc.).

The camera device 156 includes a camera configured to capture video, and may include a microphone for capturing audio data associated with the live broadcast media stream. The camera device 156 may be external to the broadcasting device 102a in the sense that the camera device 156 is separate or remote from the broadcasting device 102a. In some examples, the camera device 156 is another computing device (e.g., another smartphone, laptop, etc.). In some examples, the camera device 156 can include a wearable object equipped with a camera and/or microphone (e.g., a helmet-mounted camera, a body-mounted camera, etc.). In some examples, the camera device 156 can include a robotics device or unmanned aerial vehicle (e.g., drone). In some examples, the camera device 156 can include a camera and/or microphone assembly mounted on a vehicle, aircraft, boat, or any type of moving object.

Figure 2:
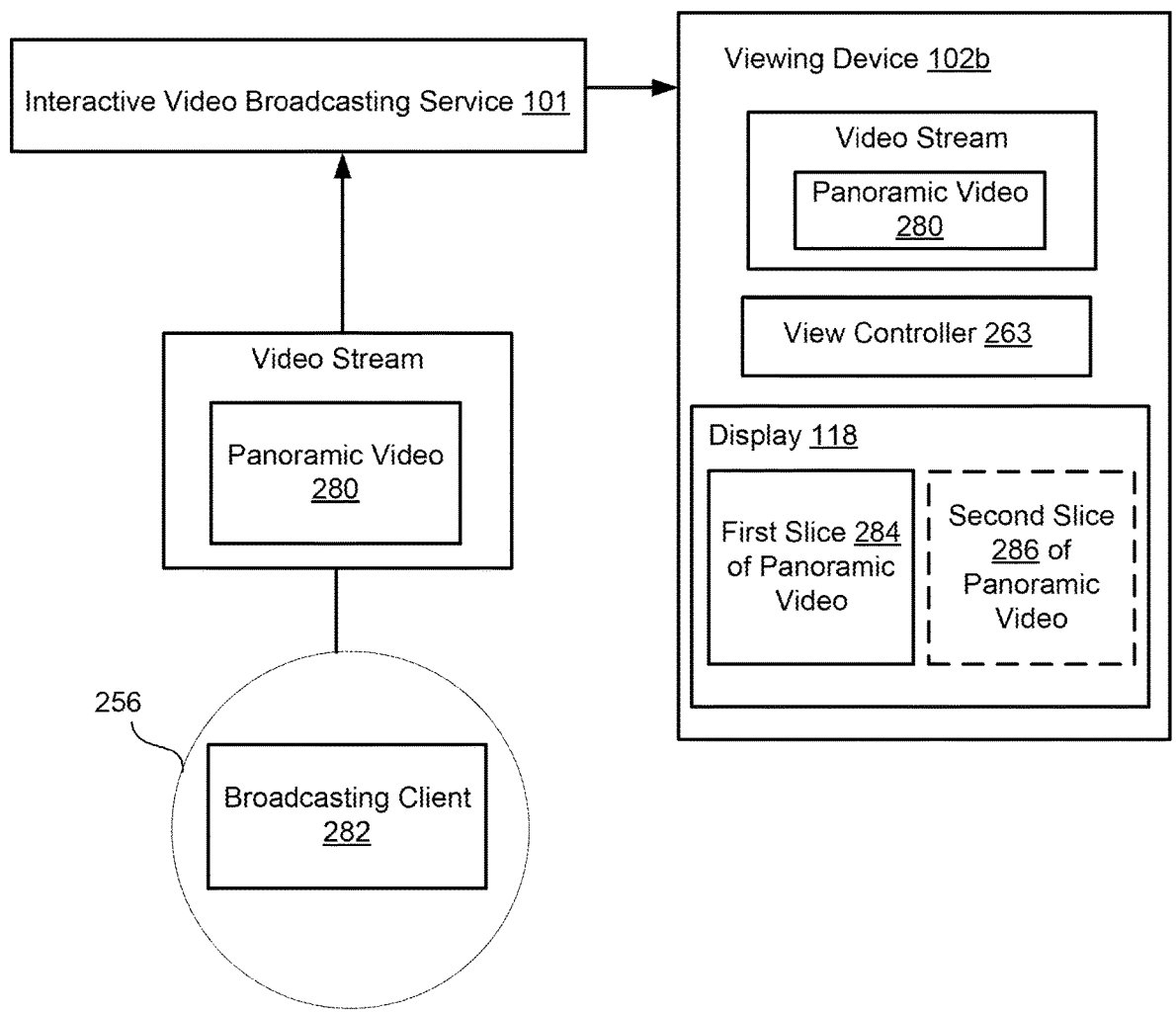
FIG. 2 illustrates a schematic diagram of a panoramic video capturing device configured to communicate with the interactive video broadcasting service of FIG. 1 according to an implementation.
Figure 3:
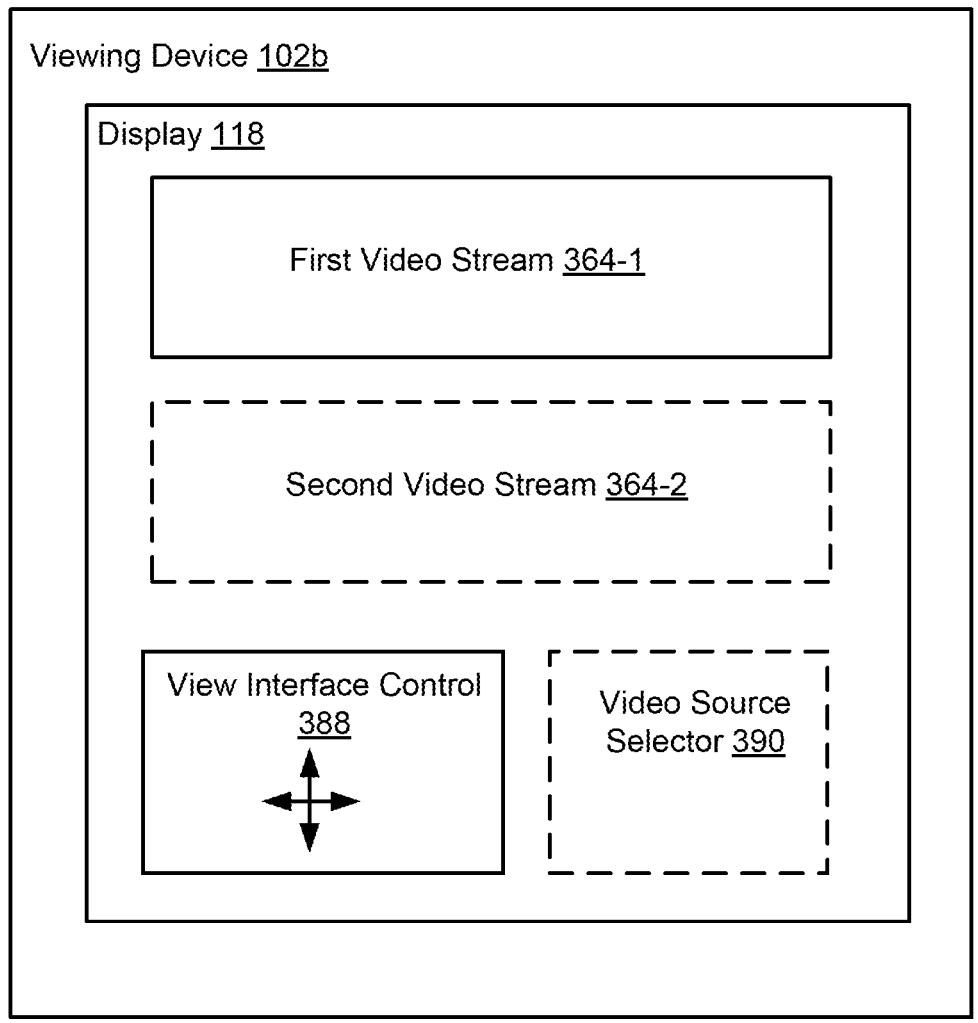
FIG. 3 illustrates a schematic diagram of a view interface control on a display of the computing device for controlling the viewing angle of the panoramic video according to an implementation.

In some examples, the camera device 156 is a panoramic video capturing device capable of capturing panoramic video surrounding the camera. FIG. 2 illustrates a panoramic video capturing device 256 configured to communicate with the interactive video broadcasting service 101 of FIG. 1 according to an implementation. The panoramic video capturing device 256 may be an example of the camera device 156 of FIG. 1. The panoramic video capturing device 256 is configured to capture panoramic video 280 surrounding the camera. In some examples, the panoramic video 280 includes video frames capturing images in an expansive view (e.g., that exceeds the gaze, forcing the viewer to turn his/her head to take everything in, or that exceeds what can be displayed on a display of the viewing device 102b). The panoramic video capturing device 256 may be a 360-degree fly camera configured to capture 360-degree video, and the panoramic video 280 may include 360-degree video. For example, the panoramic video 280 may include video frames capturing images in 360 degrees in the horizontal direction (i.e., around the camera) and 180 degrees in the vertical direction. In some examples, the panoramic video capturing device 256 may include one or more lenses and one or more curved mirrors that reflect a panoramic view (or 360-degree field of view).

The panoramic video capturing device 256 may include a broadcasting client 282. The broadcasting client 282 may be configured to enable the panoramic video capturing device 256 to communicate with the interactive video broadcasting service 101 and/or the broadcasting device 102a. For instance, in some examples, the panoramic video capturing device 256 may not be initially configured to communicate with the interactive video broadcasting service 101 and/or the broadcasting device 102a. However, incorporation of the broadcasting client 282 into the panoramic video capturing device 256 turns the panoramic video capturing device 256 into a device that can communicate with the interactive video broadcasting service 101 and/or the broadcasting device 102a. In some examples, the broadcasting client 282 can be downloaded from the interactive video broadcasting service 101 (or other network-hosted service or webpage) and installed on the panoramic video capturing device 256. In other examples, the panoramic video capturing device 256 already includes the broadcasting client 282 so that the panoramic video capturing device 256 (out of the box) can communicate with the interactive video broadcasting service 101 and/or the broadcasting device 102a. In some examples, the broadcasting client 282 may define an application programming interface (API) or software development kit (SDK) that defines a video sharing protocol that enables the panoramic video capturing device 256 and the interactive video broadcasting service 101 to communicate with each other.

During the course of the event, the interactive video broadcasting service 101 may receive the panoramic video 280 (or a portion of the panoramic video 280) from the panoramic video capturing device 256, and broadcast the video stream having the panoramic video 280 to the viewing devices (one of which is illustrated as viewing device 102b) such that each of the viewing devices 102b can independently control a viewing angle of the video stream. The viewing device 102b may include a view controller 263 configured to control the display of the panoramic video 280 on a display 118 of the viewing device 102b. For example, the view controller 263 may alter the viewing angle by deriving the appropriate slices from the panoramic video 280 that corresponds to the selected viewing angle. In other examples, the viewing controller 263 communicates with the interactive video broadcasting service 101 to request a particular slice of the panoramic video 280 so that the full panoramic video is not transmitted over the network 150 to the viewing device 102b.

The viewer can adjust the viewing angle of the panoramic video 280 during the live broadcast. For example, the viewing device 102b that joins the live feed broadcast may receive the panoramic video 280 (or a slice of the panoramic video 280), and the view controller 263 may display a slice of that panoramic video 280 such that the underlying event is shown from a particular viewing angle. As indicated above, in some examples, the viewing device 102b may receive the full panoramic video, but the view controller 263 may derive a slice of the panoramic video 280 and display that slice of video to the viewing device 102b via the display 118. In other examples, the viewing device 102b receives only a slice of the panoramic video 280 that is selected to be displayed on the display 118. In either case, only a slice of that panoramic video 280 is displayed at a particular time, but the viewing angle can be changed (e.g., by the broadcaster or the viewer) so that the full scope of the panoramic video 280 can be explored. As shown in FIG. 2, the viewing device 102b may provide, via the display 118, a first slice 284 of the panoramic video 280 according to a first viewing angle. The first slice 284 of the panoramic video 280 may be a portion of the panoramic video 280 that corresponds to a particular viewing angle of the panoramic video capturing device 256. After viewing the event from that particular angle, the view controller 263 may receive a change to the first viewing angle. Then, the view controller 263 may provide, via the display 118, a display of a second slice 286 of the panoramic video 280 according to a second viewing angle, where the second viewing angle provides a different perspective of the panoramic video 280 than what was provided by the first viewing angle.

In some examples, the user can manipulate a physical orientation of the viewing device 102b (e.g., tilt to the right/left, tilt forward/backwards) in order to view the event from another viewing angle captured by the panoramic video capturing device 256. For example, the viewing device 102b may include internal sensors configured to sense a physical orientation of the viewing device 102b. When the physical orientation of the viewing device 102b is in a first orientation (e.g., a horizontal orientation), the view controller 263 may provide a display of the panoramic video 280 according to a first viewing angle. Then, the user may manipulate the physical orientation of the viewing device 102b to a second orientation (e.g., tilt to the left) in order to provide a different view of the panoramic video 280. When the physical orientation of the viewing device 102b is in the second orientation, the view controller 263 may provide a display of the panoramic video 280 according to a second viewing angle. The user may continue to manipulate the physical orientation of the viewing device 102b (e.g., to a third orientation (e.g., tilt to the right) and a fourth orientation (e.g., tilt forward)), and the view controller 263 may provide a display of the corresponding viewing angles. By changing the physical orientations of the viewing device 102b, a viewer can explore the full scope of the panoramic video 280.

Figure 4:
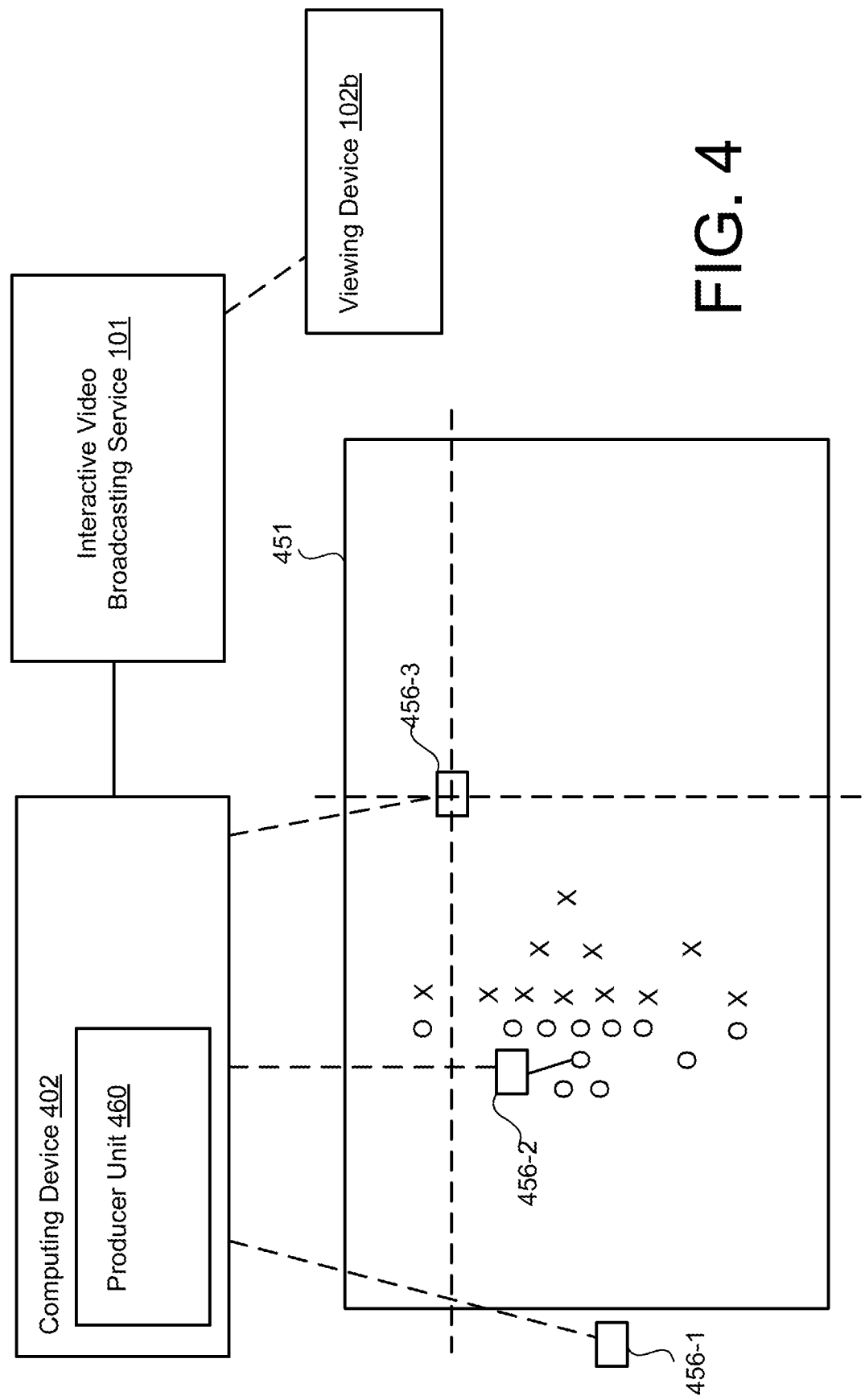
FIG. 4 illustrates a schematic diagram of a system having an interactive video broadcasting service that operates in conjunction with multiple camera devices for broadcasting an event to a plurality of viewing devices according to an implementation.

In other examples, the user can manipulate the viewing angle of the panoramic video 280 by operating a view interface control 488, as shown on FIG. 4. FIG. 4 illustrates a view interface control 388 on the display 118 of the viewing device 102b for controlling the viewing angle of the panoramic video 280 according to an implementation. The view interface control 388 may be any type of user interface control. The user can manipulate the view interface control 388 to adjust the viewing angle of the panoramic video 280 of the video stream (e.g., changing from the first viewing angle to the second viewing angle, etc.). In some examples, the viewing device 102b may provide a display of a first video stream 364-1 captured by a first camera device such as the panoramic video capturing device 256. The user may operate the view interface control 388 to control the viewing angle of the panoramic video 280 of the first video stream 364-1. In some examples, the viewing device 102b may provide a display of a second video stream 364-2 captured by a second camera device that is different from the first camera device. In some examples, the viewing device 102b may provide a concurrent display of both the first video stream 364-1 and the second video stream 364-2 such that the user can experience a multi-perspective view of the underlying event. In other examples, the viewing device 102b provides a single video stream at a particular time, and the user can switch between the first video stream 364-1 and the second video stream 364-2 using a video source selector 390, which may be a type of user interface control that can provide an option for the user to select between multiple streams.

FIG. 4 illustrates a schematic diagram of a system 400 having the interactive video broadcasting service 101 that operates in conjunction with multiple camera devices 456 for broadcasting an event such as a football game to a plurality of viewing devices (one of which is the viewing device 102b) according to an implementation.

The system 400 may include a plurality of camera devices 456 that are configured to capture the event from different angles. The camera devices 456 may include any of the camera devices previously described. The example of FIG. 4 depicts three camera devices, e.g., a first camera device 456-1, a second camera device 456-2, and a third camera device 456-3. However, the embodiments may include any number of camera devices 456. The first camera device 456-1 may be a stationary device located close to but off the field 451, the second camera device 456-2 may include a panoramic video capturing device (e.g., the panoramic video capturing device 256) configured as a body-mounted or helmet counted camera that is coupled to one of the players (e.g., the quarterback), and the third camera device 456-3 may be a movable camera coupled to suspension wires above the field 451. Each of the camera devices 456 may be configured to communicate with the interactive video broadcasting service 101 such that the event can be broadcasted to the viewing devices 102b. It is noted that the Xs and Os represent players on different teams on the field 451 during the football game.

In some examples, the user may operate the viewing device 102b to switch among the plurality of camera devices 456 (e.g., using the video source selector 390), and/or view multiple video streams at the same time. In other examples, the timing and video source selection may be centrally controlled from a producer unit 460 on a computing device 402. In some examples, the computing device 402 may be an instance of the broadcasting device 102a of FIG. 1. The computing device 402 may centrally control the audio/video source selection, and enable the plurality of camera devices 456 to capture the event from multiple angles. The producer unit 460 may define an interface that allows a user to control the live feed broadcast using the plurality of camera devices 456, as well as other video editing capabilities (e.g., overlays, advertising inserts, etc.).

In some examples, the computing device 402 may be operated by the producer of the event, and the producer may select different video sources (e.g., among the first camera device 456-1, the second camera device 456-2, and the third camera device 456-3) for the live feed video stream during the course of the event. Also, the producer may control the display of the viewing angle of the panoramic video 280 captured by the second camera device 456-2. As such, the producer controls which content to provide to the viewing devices 102b during the live broadcast. In other examples, the video source selection and viewing angle control are shared or divided among the producer and the viewing devices 102b. For instance, the interactive video broadcasting service 101 may provide a first video stream associated with the producer's account (or producer's computer), and the video source for the first video stream may be changed during the live broadcast by only the producer (e.g., broadcast from a moving camera device, and then switch to a drone-equipped camera device, etc.). In some examples, the interactive video broadcasting service 101 may concurrently provide a second video stream to the viewing devices 102b, and the video source selection and/or the viewing angle control may be independently controlled by the viewing devices 102b. For example, the second video stream may be associated with the second camera device 456-2, and the display of the second video stream may be located in an area separate from the first video stream. In some examples, the second video stream is the panoramic video 280 from the second camera device 456-2, and each viewing device 102b may independently control the viewing angle of the panoramic video 280 as explained above. In other examples, each viewing device 102b may independently control the video source selection by selecting a certain camera device among a plurality of camera devices 456 as the video source for the second video stream.

Referring back to FIG. 1, the interactive streaming application 132 can connect to one or more of the camera devices 156, and provide the option to the broadcaster to select which audio and/or video source to use for the broadcast video stream. In some examples, the interactive streaming application 132 may select the type of network connection to the camera device 156, which may be based on the type of camera device, video quality, audio quality, and/or the range between the broadcasting device 102a and the camera device 156. In some examples, if the camera device 156 is a type of drone device, a short-range communication network such as Bluetooth may not work because the drone device may be too far out of range from the broadcasting device 102a. In this case, the interactive streaming application 132 may select a mobile network connection such as 4G or Wi-Fi network for communicating with the camera device 156. Also, the interactive streaming application 132 may switch from one type of network connection to another type of network connection during the broadcast when the currently-used network connection provides a relatively low video and/or audio quality, or the camera device 156 moves out of range for a particular network connection. Also, the interactive streaming application 132 may select another audio and/or video source when the currently-provided video and/or audio source provides a relatively low video and/or audio quality. For example, the interactive streaming application 132 may switch to another camera device 156 during the course of broadcasting the video stream when the video quality drops below a threshold level.

Also, the interactive streaming application 132 may select an audio source from multiple audio sources, which may or may not be the same source that is used to provide the video data of the broadcast media stream. For example, the camera device's microphone may capture audio data associated with the broadcast media stream. Depending on the quality of the audio data (and potentially the quality of the video data), the interactive streaming application 132 may switch to another camera device 156 or decide to use the broadcasting device's camera. In one example, if the sound of the audio data captured by camera device 156 is below a threshold level (or the quality of the audio data is below a threshold level), the interactive streaming application 132 may switch the audio source to the broadcasting device 102a.

In some examples, the broadcaster may operate the interactive streaming application 132 to enable multiple camera devices 156 to be connected to the interactive video broadcasting service 101 such that the interactive video broadcasting service 101 can stream from multiple sources to provide the viewers with different viewing angles of the same event at the same time or at different times. The broadcaster may operate the interactive streaming application 132 to switch the video and/or audio sources of the broadcast media stream before or during the broadcast. In other examples, the interactive streaming application 132 may automatically select the video and/or audio sources of the broadcast media stream before or during the broadcast in the manner as explained above.

In other examples, the interactive video broadcasting service 101 may include a source manager 175 configured to manage the audio and/or video sources of the broadcast media stream. For example, the source manager 175 may be configured to automatically select between the camera devices 156 and the broadcasting device 102a for the video and/or audio source(s) of the broadcast media stream before or during the broadcast, in the same manner as discussed with respect to the interactive streaming application 132. In some examples, the source manager 175 may manage information about the various audio and/or video sources such as the type of camera device(s) 156 that are used to capture the underlying event, the type of connection used in conjunction with a respective camera device 156, and/or any other information about these devices. Also, in some implementations, the source manager 175 may select the type of network connection to be used in conjunction with a respective camera device 156.

In some examples, the automatic switching may be based on the engagements associated with the broadcast video stream (e.g., the amount of signals of approval, comments, and/or join messages, etc.). In one example, the broadcasting device 102a may be a smartphone that is tucked away, so that the broadcaster will not be able to see or monitor the received engagements on the display 118, and the video source may be automatically switched based on the amount of engagements (e.g., the event may be broadcast from two or more video sources, which receive engagements on the various different view points or angles, and the one with the highest amount of engagements may be automatically selected). Alternatively, the interactive streaming application 132 may enter an audio or haptic feedback mode in which the signals of approval make a sound or cause the broadcasting device 102a to vibrate, and the broadcaster can manual switch video sources (e.g., by providing audio commands to the interactive streaming application 132 or operating it's user interface). In another implementation, comments from the viewers can be verbalized (e.g., through the speaker or through ear phones connected to the broadcasting device 102a). Based on the comments, the broadcaster may decide to switch to another video source.

In some examples, the source manager 175 (or the interactive streaming application 132) may automatically select the video source based on the number of signal of approval on the broadcast media stream from the viewing devices. For example, the broadcast media stream may be initially broadcasted with the camera device 156 as the video source. The source manager 175 may determine the amount of approval signals associated with this broadcast during a period of time, and if the number is below a threshold amount, the source manager 175 may switch the video source to another video source. In some examples, if the number of approval signals is above a threshold amount, the source manager 175 may determine to keep the video source as the camera device 156. In other examples, the source manager 175 and/or the interactive streaming application 132 may use information from an accelerometer on the broadcasting device 102a or the camera device 156, and switch the audio and/or video sources of the broadcast media stream. For example, an event may be initially broadcasted with the camera device 156, but the source manager 175 and/or the interactive streaming application 132 may detect acceleration of the broadcasting device 102a or another camera device 156, and then decide to switch to a new video source. For example, the camera device 156 may be equipped with an accelerometer, and if the source manager 175 and/or the interactive streaming application 132 detects acceleration above a threshold level, the source manager 175 and/or the interactive streaming application 132 may switch to that camera device 156 (which may indicate that some kind of action is taking place around that camera device 156). In other examples, the source manager 175 and/or the interactive streaming application 132 may use information from a GPS device included in the broadcasting device 102a and/or the camera device 156, and based on the location data, the source manager 175 and/or the interactive streaming application 132 may switch the video and/or audio sources.

The interactive video broadcasting service 101 provides a shared broadcast generated by a user without specialized equipment or networks. The live video broadcast stream may include a closed feedback loop in which engagements from viewers (e.g., the viewing device(s) 102b) are provided to the broadcaster (e.g., the broadcasting device 102a) and/or to other viewing devices 102b in real time or near real time. For example, a viewer using the viewing device 102b may comment on the broadcast, may signal approval for specific moments in the broadcast (e.g., likes, taps, etc.), and may invite other social media users to join the broadcast while viewing the live video broadcast stream.

In some examples, such engagements are provided back to viewers and the broadcaster within a latency period (e.g., two seconds or less) suitable to allow the broadcaster to react to and interact with the viewers. For example, the interactive video broadcasting service 101 may provide representations of these activities to all participants in the broadcast. Thus, the broadcaster and anyone viewing the broadcast may see the comments posted and indications of approval from any viewer.

The interactive streaming application 132 may also be configured to attach a timestamp packet to the frames of the real-time video stream provided from the viewing device 102b and/or the broadcasting device 102a to the server computer 160. This special packet enables the server computer 160 to associate an engagement with a particular time in the live feed broadcast. For example, a viewer may be watching a live video broadcasting stream, and may tap the screen (indicating he/she likes a certain part of the broadcast), or the viewer may provide a comment at a particular moment in the broadcast. The interactive streaming application 132 may provide information about that engagement to the server computer 160. The information about the engagement may include an identifier for who provided the signal and when it was provided, for example by identifying the time in the timestamp packet associated with the frame being displayed when the engagement was received. The server computer 160 may receive the engagements and may provide information about the engagements to the viewers and the broadcaster. The engagements may include comments, signals of appreciation, share notifications, viewer join notifications, etc. This information may be used, at each device 102a, 102b, to generate representations of the engagement, as described below.

For example, a signal of appreciation may be represented by an icon. The icon may be a heart shape, a star shape, a smiley face shape, or some other shape. The interactive streaming application 132 may be configured to add an icon to the user display during the real-time video stream for each signal of appreciation. Each signal of appreciation may be received from one of the viewers of the real-time video broadcast stream. A viewer may send a plurality of signals of appreciation during the real-time video stream, so that a viewer is not limited to signaling appreciation for the video broadcast stream once. Instead, the signals of appreciation may be associated with a particular moment of time in the real-time video broadcast stream and a viewer can send as many signals as desired. In some examples, the icon representing a signal of appreciation may have a different appearance for each viewer. Then, the broadcaster may decide to continue the broadcast when the broadcast is popular as suggested by the number of viewers, by a high level of engagements, viewer comments, and other feedback, and/or by the identity of one of more viewers.

When a broadcast ends, the interactive video broadcasting service 101 may store the broadcast in stored video broadcast streams 164. The video broadcast stream can be stored for only a period of time, e.g., 2 hours, 24 hours, one week, one month, etc., or may be stored indefinitely. A viewer using the viewing device 102b may replay the saved broadcast and may see the comments, approvals, and notification messages in the same place that live viewers also saw these elements. In some implementations, the replay viewer may add additional appreciation signals using the viewing device 102b.

The interactive video broadcasting service 101 may include an interactive video sharing engine 170. The interactive video sharing engine 170 may service a social media platform, and thus, have access to a connection graph 168 for the social media platform. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application 132.

The interactive video sharing engine 170 may aggregate the different types of engagements, generating statistics for the broadcast. For example, the interactive video sharing engine 170 may track the number of signals of appreciation received from all viewers per minute, track the total number of signals of appreciation, track the comments per minute, track the total number of comments, track the total number of viewers, track the average viewing time of the viewers, track the number of shares, etc. The statistics may be stored in the broadcast metadata 166. The broadcast metadata 166 may be used to feature popular broadcasts (e.g., measured by number of viewers, average of signals of appreciation per second correspondence with social media messages or other broadcasts, etc.) for replay, to suggest popular broadcasters (e.g., based on total number of signals of appreciation received over all broadcasts or based on a high average number of signals of appreciation per second across all the broadcasts for the broadcaster, etc.), to notify potential audience members about a popular live broadcast.

The interactive video sharing engine 170 may include a video streaming engine 172. In some implementations, the targeted viewer may only view the real-time video stream if the viewing device 102b used by the targeted viewer has the interactive streaming application 132 installed. Once a targeted viewer chooses to join the real-time video broadcast stream, the video streaming engine 172 may provide the encoded real-time video broadcast stream to the viewing device 102b. The video streaming engine 172 may be configured to provide the video broadcast stream, including any added engagement indications, to the viewing devices 102b in a format appropriate for a particular viewing device 102b. For instance, the video streaming engine 172 may be configured to receive the video broadcast stream from the broadcasting device 102a (or a camera device 156) and to provide it in a variety of different formats or playback on the viewing devices 102b. Thus, the video streaming engine 172 may convert the live video broadcast stream from the broadcasting device 102a (or the camera device 156) into a plurality of formats and, when the viewing device 102b joins the real-time video broadcast stream, the video streaming engine 172 may select, based on information about the viewing device 102b, an appropriate format for the viewing device 102b.

The video streaming engine 172 may use the connection graph 168 to determine user accounts directly related to the user account for the broadcaster of the broadcasting device 102a. These directly related user accounts may receive a message, for example a push notification, regarding the video broadcast stream. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video broadcast stream. Thus, in some implementations, a private broadcast may be for a subset of the user accounts directly related to the broadcaster account in the connection graph 168 (e.g., followers, friends, circles, or other forms of associations), whereas a public broadcast can be joined by anyone, but only accounts directly related to the broadcaster are notified of the live video broadcast stream.

The interactive video broadcasting service 101 may include a video discovery engine 174. The video discovery engine 174 may enable the interactive video sharing engine 170 to suggest real-time video broadcast streams and/or stored video broadcast streams, e.g., in stored video broadcast streams 164, to the viewing device 102b. In some implementations, the video discovery engine 174 may use the broadcast metadata 166 to provide or suggest real-time video broadcast streams to a user. For example, the video discovery engine 174 may suggest a real-time video broadcast stream that has received many signals of appreciation in a short duration, a real-time video broadcast stream that has a quantity of viewers that exceeds a threshold, a real-time video broadcast stream that has an average number of engagements per second that exceeds a threshold, etc. The video discovery engine 174 may boost the position of a real-time video broadcast stream in the search result based on attributes of the user.

The video discovery engine 174 may also use location data to suggest real-time video broadcast streams for viewing. For example, the video discovery engine 174 may identify several real-time video broadcast streams that are in close proximity to each other. Such real-time video broadcast streams may be an indication of an important event occurring at the location. The video discovery engine 174 may suggest one or more of these real-time video broadcast streams (e.g., selected at random, based on past popularity of the broadcaster, baaed on number of viewers of the stream, etc.) as a suggested real-time video broadcast stream.

In some examples, the video discovery engine 174 may initiate a user interface that shows the location of the real-time video broadcast streams and may enable a user to select one of the real-time video broadcast streams for preview of viewing. For example, the user may navigate in a map that includes an icon representing the location of live video broadcast streams and the user may select an icon to join or preview the live video broadcast stream associated with the location. In some examples, the video discovery engine 174 may receive a query from a user and search titles of live video broadcast streams and/or comments provided in live video broadcast streams and provide video broadcast streams with responsive titles or comments in a search result to the viewer. The video discovery engine 174 may also search titles and comments for stored video broadcast streams and may provide one or more stored video broadcast streams in the search result.

The interactive video broadcasting service 101 may include a video editor 178 may function as a replay generator that can select shortened clips or video summaries (i.e., the replays 177) that capture past key activities of a developing event, and provide these replays to viewers who did not begin watching until after the past key activities occurred so they may be brought up-to-date with respect to the live event. After the live stream of the event has stopped, these replays 177 (in addition to the full broadcast) may be aggregated chronologically and stored as one or more networked accessible videos so that viewers may opt to watch just the key activities rather than the full event. Optionally, the replays 177 are programmatically selected based on any type and any combination of available information suitable for detecting the occurrence of key activities, examples of which include indications of viewer interest, viewer engagement, and popularity with viewers. An example measure of viewer interest is impression. Example measures of viewer engagement include hearts, comments, and re-Tweets. Example measures of popularity include broadcaster identity, viewer identity, impression, and re-Tweets. (The respective machine learning models for interest, engagement, and popularity may use common information.) The replays 177 may be programmatically selected when the measures of interest, engagement, and popularity reach a threshold level suggesting a reasonable likelihood of an occurrence of a key activity. Parameters of machine learning models and the threshold are adjusted to improve accuracy.

Optionally, frames of the live stream broadcast are programmatically analyzed to detect key activities, either during the broadcast or afterwards, and this information is used in conjunction with the information described above to programmatically select the replays 177 of the broadcast. A change in the appearance of a scoreboard of a softball game is detected, for example, and in conjunction with comments suggesting a home run has been hit and identifying the hitter, and a spike in the number of hearts from viewers connected to the hitter on a social graph, a segment of the broadcast sufficient to capture the home run is selected and made into a replay 177.

Figure 5:
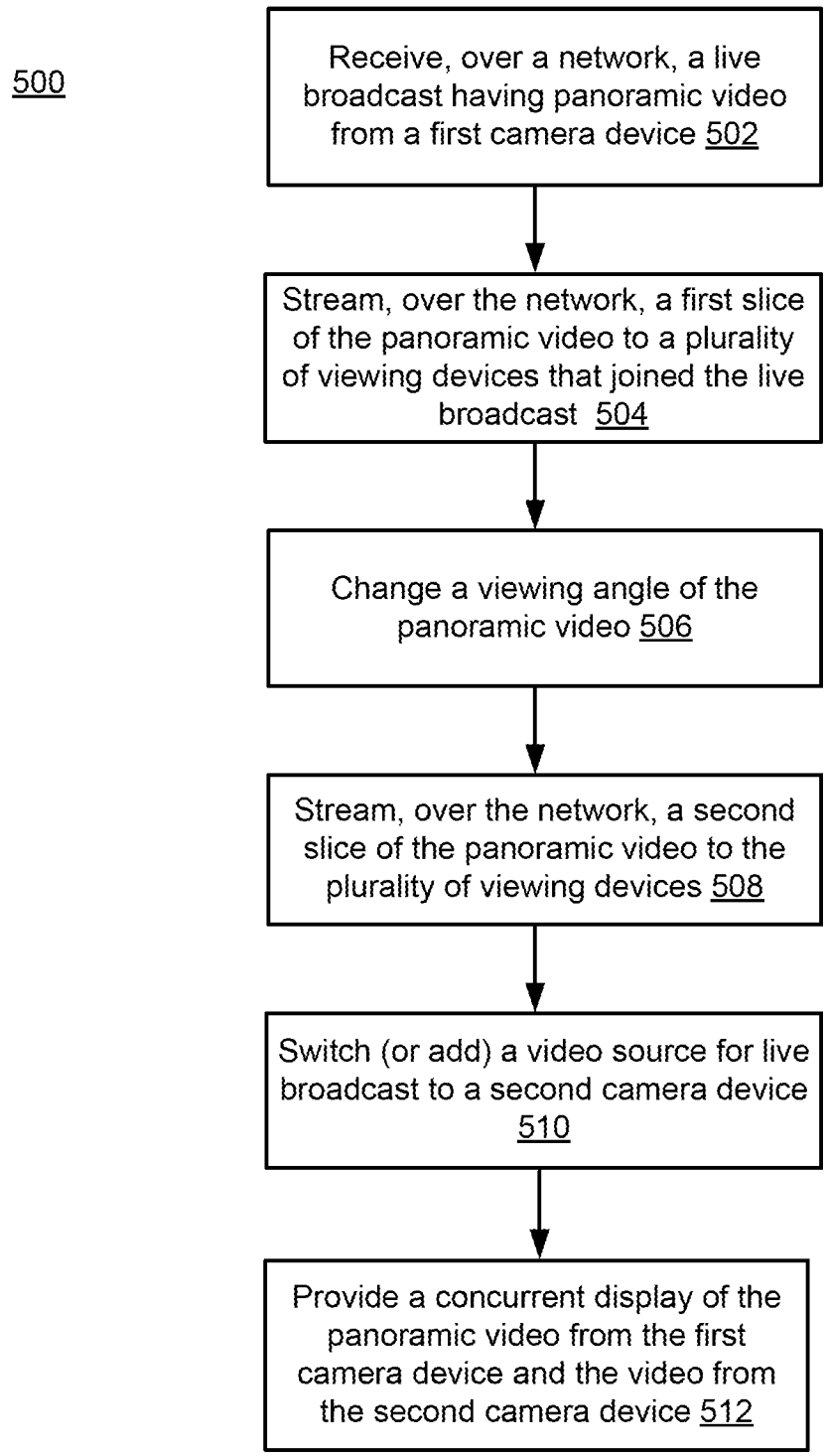
FIG. 5 illustrates a flow chart illustrating a method depicting example operations of the various systems disclosed herein according to an implementation.

FIG. 5 illustrates a flow chart illustrating a method 500 depicting example operations of the various systems disclosed herein according to an implementation. In some examples, the operations of the method 500 may be performed by a system having at least one processor 176, and a non-transitory computer-readable medium having executable instructions that when executed by the at least one processor 176 are configured to execute an interactive video broadcasting service 101, where the interactive video broadcasting service 101 is configured to provide the following operations.

A live broadcast having panoramic video from a first camera device may be received over a network (502). For example, the interactive video broadcasting service 101 may receive a video stream having panoramic video 280 captured from the panoramic video capturing device 254 (e.g., the first camera device). The interactive video broadcasting service 101 may receive the panoramic video 280 directly from the panoramic video capturing device 254. For instance, the panoramic video capturing device 254 may include the broadcasting client 282 that may define APIs and/or SDKs that enable the panoramic video capturing device 254 to communicate directly with the interactive video broadcasting service 101. In other examples, the interactive video broadcasting service 101 may receive the panoramic video 280 through the broadcasting device 102a. In some examples, the panoramic video capturing device 254 is a 360-degree fly camera, and the 360-degree video is uploaded to the interactive video broadcasting service 101. In some examples, the full 360-degree video is uploaded to the interactive video broadcasting service 101. In other examples, one or more slices of the 360-degree video is uploaded to the interactive video broadcasting service 101, where the slice(s) represent a portion or subset of the full 360-degree video (e.g., the video frames corresponding to a particular viewing angle).

A first slice of the panoramic video may be streamed to a plurality of viewing devices that joined the live broadcast (504). In some examples, the interactive video broadcasting service 101 streams, over the network 150, a first slice of the panoramic video 280 to any viewing device 102b that joined the live broadcast. The first slice of panoramic video 280 may represent a portion or subset of the full 360-degree video. For instance, if the panoramic video capturing device 254 is a head-mounted video camera (e.g., mounted on a quarterback's helmet), the panoramic video capturing device 254 may capture every scene around the camera. However, the interactive video broadcasting service 101 may stream only a portion of that 360-degree video to the viewing devices 102b.

A viewing angle of the panoramic video may be changed (506), and a second slice (and other slices) of the panoramic video may be streamed over the network to the plurality of viewing device (508). For example, the producer unit 460 of the computer device 402 may centrally control how the 360-degree video is panned around the video. In addition, the producer unit 460 may control the selection and timing of which video source(s) to use to broadcast the event to the plurality of viewing devices 102b. For example, the underlying event may be broadcasted to the plurality of viewing devices 102b using multiple camera devices 154. As such, the producer unit 460 may switch (or add) a video source for the live broadcast to a second camera device (510). Further, the producer unit 460 may provide a concurrent display of the panoramic video from the first camera device and the video from the second camera device (512) so that the viewers can experience the event from multiple angles.

FIG. 6 illustrates a flow chart illustrating a method 600 depicting example operations of the various systems disclosed herein according to an implementation.

A live broadcast of an event that is shared by an interactive video broadcasting service may be joined (602). For example, the viewing device 102b may operate the interactive streaming application 132 to select a live broadcast (e.g., the user may navigate the app to search for a particular broadcast of interest, or may have receive an indication of a broadcast from a broadcaster in which the viewer follows). Then, a first video stream having video captured from a camera device configured as a first video source may be received, and the video may be displayed on a display screen (604). For example, the viewing device 102b may receive the first video stream from the interactive video broadcasting service 101, where the video was captured from a camera device 154 configured as a video source for the event. The viewing device 102b may display the video from the stream on the viewing device's display.

A second video stream having panoramic video captured from a panoramic video capturing device configured as a second video source may be received, and a portion of the panoramic video may be display in a first viewing angle on the display screen (606). For example, the viewing device 102b may receive a secondary video stream from a separate camera device which is the panoramic video capturing device 254, and a portion (or slice) of the 360-degree video may be displayed on the viewing device's display screen. In some examples, both the 360-degree video and the video from the camera device may be concurrently displayed in separate areas of the display screen. In other examples, the live broadcast may dynamically switch between these two video sources during the course of the event. However, when the 360-degree video is displayed, the viewing devices 102b may independently control the panning of the 360-degree video. In other examples, the panning of the 360-degree video is centrally controlled by a producer of the event. For instance, a change to the viewing angle may be received (608), and another portion of the panoramic video corresponding to a second viewing angle may be displayed, where the second viewing angle provides a different perspective of the video stream than what was provided by the first viewing angle (610). In some examples, the interactive streaming application 132 is configured to receive an indication of a physical orientation of the viewing device 102b, and switch to the second viewing angle based on the indication. In some examples, the interactive streaming application 132 is configured to receive a selection from a user interface of the interactive streaming application 132, and switch to the second viewing angle based on the selection.

Figure 7:
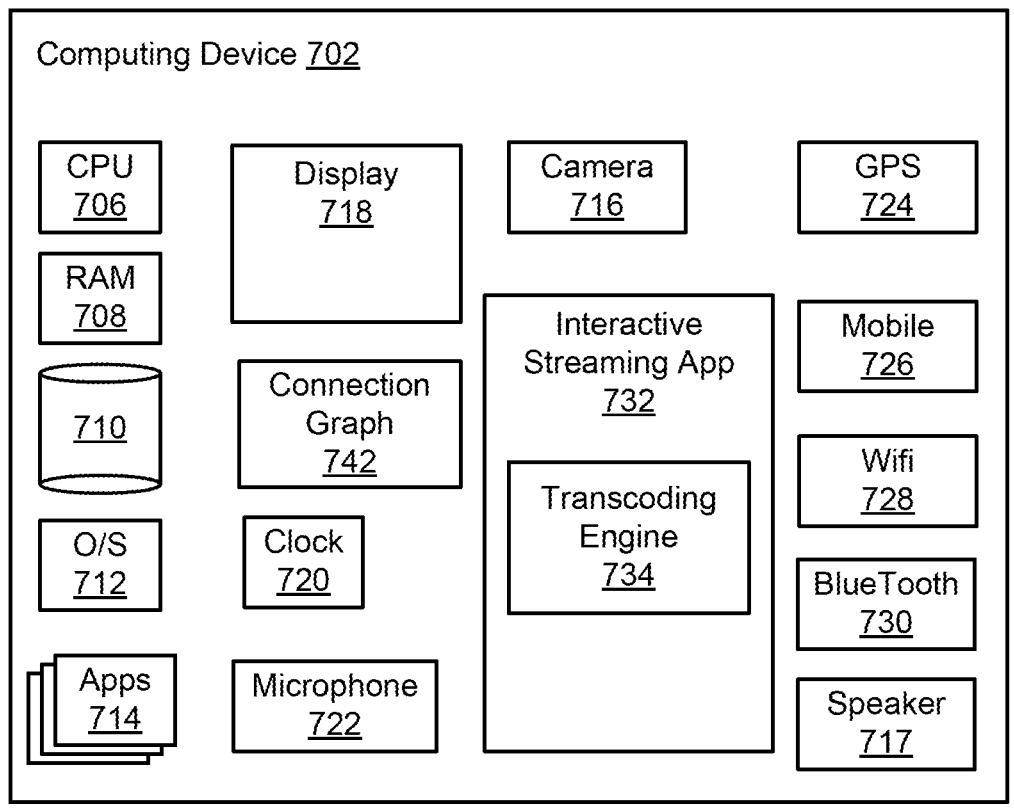
FIG. 7 is a schematic diagram of a computing device according to an implementation.

FIG. 7 is a schematic diagram of a computing device 702 according to another implementation. In some examples, the computing device 702 is the broadcasting device 102a of FIG. 1. In some examples, the computing device 702 is the viewing device 102b of FIG. 1.

As shown in FIG. 1, the computing device 702 may include one or more processors 706 (e.g., a processor formed in a substrate, such as a central processing unit, a graphics processor, etc.), a volatile memory 708, and nonvolatile memory 710. The volatile memory 708 may store, for example, instructions that are executed by the processor(s) 706, and the nonvolatile memory 710 may store, for example, various user data, instructions for executing an operating system, applications, etc.

The computing device 702 may include a plurality of applications 714, which can be executed by the computing device 702 (e.g., by the processor 706 executing one or more instructions stored in memory 708 or 710 that correspond to the application) and which may communicate with the operating system 712 (e.g., through one or more application programming interfaces (APIs)). Execution of the applications 714 can provide various functionalities to a user of the computing device 702. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to use of a camera 716 within the computing device 702 for capturing still pictures or video. In some implementations, the camera 716 may be external to the computing device 702, such as a camera that communicates wirelessly, e.g., via BLUETOOTH or Wi-Fi, with the computing device 702. Applications that provide a rich variety of other functionalities and information to the user also can be provided. In some implementations, the interactive streaming application 732 may be considered one of the applications 714. Referring to FIGS. 1 and 7, in some examples, the interactive streaming application 132 is the interactive streaming application 732.

The computing device 702 includes a display 718 (e.g., a touchscreen display, an LED display, etc.) that can display a user interface for an application 714 that is being executed by the device. More than one application can be executed at a time. However, in some implementations (e.g., in the case of a smart phone), the size of the display is better suited for a single executing application to be displayed at a time. The executing application that is displayed on the display 718 can be referred to as a "front-facing" application. In some implementations, the display 718 may be housed in a structure separate from a structure housing one or more of the other components of the computing device 702 (e.g., the display 718 is a stand-alone display).

The computing device 702 may include internal speakers 717 that can provide an audio output from the device. The computing device 702 may also include a port or interface (e.g., USB, micro-USB, cable interfaces, HDMI, wireless interface, etc.) that can be used to connect the computing device 702 to external devices, e.g., speakers that may provide an audio output when connected to the device 702 or other types of sensors, cameras, or computing devices. The computing device 702 may also include a microphone 722 that detects sound in the environment of the computing device 702. In some implementations, the microphone 722 may be external to the computing device 702. The microphone 722, whether internal or external, may provide audio for a live video stream.

The computing device 702 may also include a clock 720 that determines a time and date and may include a GPS transceiver 724 that communicates with a global positioning system to determine a location of the computing device 702. The location may be provided as part of the metadata associated with a real-time video stream. The computing device 702 also includes various network interface circuitry, such as for example, a mobile network interface 726 through which the computing device 702 can communicate with a cellular network, a Wi-Fi network interface 728 with which the computing device 702 can communicate with a Wi-Fi base station, a BLUETOOTH network interface 730 with which the computing device 702 can communicate with other BLUETOOTH devices (e.g., an external camera, microphone, or speakers), and/or an Ethernet connection or other wired connection that enables the computing device 702 to access the network 150 of FIG. 1. The computing device 702 may include other sensors (not shown), such as, for example, an ambient light sensor, a temperature sensor, physical orientation sensors, and/or an accelerometer, etc. In some examples, a connection graph 742 may be a subset of the connection graph 168 that resides on the server computer 160. A connection graph is a data structure representing relationships (i.e., connections) between one or more entities. For example, the connection graph 742 may be a data set that stores relationships between social media accounts. Relationships may include friending, following, linking, or some other relationship. An entity is directly connected to another entity in the connection graph 742 when the two entities are connected by a path length of one, i.e., there are no intervening nodes.

After receiving a request from the user who wants to begin a broadcast, the interactive streaming application 732 may be configured to use various components of the computing device 702 or components in communication with computing device 702 to capture and send a real-time video stream and to display interactions (e.g., engagement representations) from viewers of the real-time video stream. For example, the interactive streaming application 732 may use the camera 716, the GPS 724 (or other location-obtaining sensors), and the microphone 722 of the computing device 702 to capture a real-time video stream with audio. In some implementations, the GPS 724 may associate a location with the real-time video stream.

Referring to FIGS. 1 and 7, in some examples, the interactive streaming application 732 may include a transcoding engine 734, which may be configured to determine the throughput between the computing device 702 and the server computer 160 via the network 150. The throughput represents the bandwidth available to transmit the real-time video stream from the computing device 702 to the server computer 160. When bandwidth is low, the transcoding engine 734 is configured to reduce the video quality sent to the server computer 160. This differs from conventional streaming systems where the server computer 160 determines the video quality sent to each viewer based on the viewer's connection. In contrast, the interactive streaming application 732 decides the video quality for all viewers based on the bandwidth available to the computing device 702. This ensures that latency is kept low, e.g., a few seconds or less. The low latency ensures that engagements are relevant to the broadcaster—in other words, the broadcaster receives almost real-time engagements. A latency more than a few seconds, and certainly a latency of 30 seconds or more would make engagements too old to provide effective communication between the broadcaster and the viewers.

In some examples, referring to FIGS. 1 and 7, the interactive streaming application 732 may also be configured to attach a timestamp packet to the frames of the real-time video stream provided from the computing device 702 to the server computer 160. This special packet enables the server computer 160 to associate an engagement with a particular time in the live feed broadcast. The interactive streaming application 732 may also be configured to use one of the computing components (e.g., Wi-Fi network interface 728, mobile network interface 726, etc.) to provide the real-time video stream, over the network 150, to the interactive video broadcasting service 101. The interactive streaming application 732 may also be configured to receive engagement indications as well as metadata about the real-time video stream from the server computer 160. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The interactive streaming application 732 may be configured to receive the data stream and to generate representations of the engagement indications in the data stream and provide the representations to the display 718.

The interactive streaming application 732 may be configured to trigger the display of the icons (e.g., hearts) for a predetermined period of time. For example, each icon may appear on the display 718 of the computing device 702 for three or five seconds and then disappear or fade out. The engagement may be associated with a specific time, e.g., a timestamp from a timestamp packet in the video stream, and an engagement may be displayed during a period that starts at the timestamp until the predetermined period of time expires. In some implementations, the interactive streaming application 732 may be configured to animate the icons on the display 718 while displayed. For example, the interactive streaming application 732 may cause the icons to move from a first location to a second location during the predetermined period of time. The movement need not be linear, but may be in a general direction. For instance, the icon may float up or sink down a side edge of the display 718 or move generally across a top or bottom edge of the display 718 during the predetermined time. The interactive streaming application 732 may be configured to display and animate a plurality of the icons, each icon representing a single signal of appreciation. The icons may overlap with each other in the display.

Figure 8:
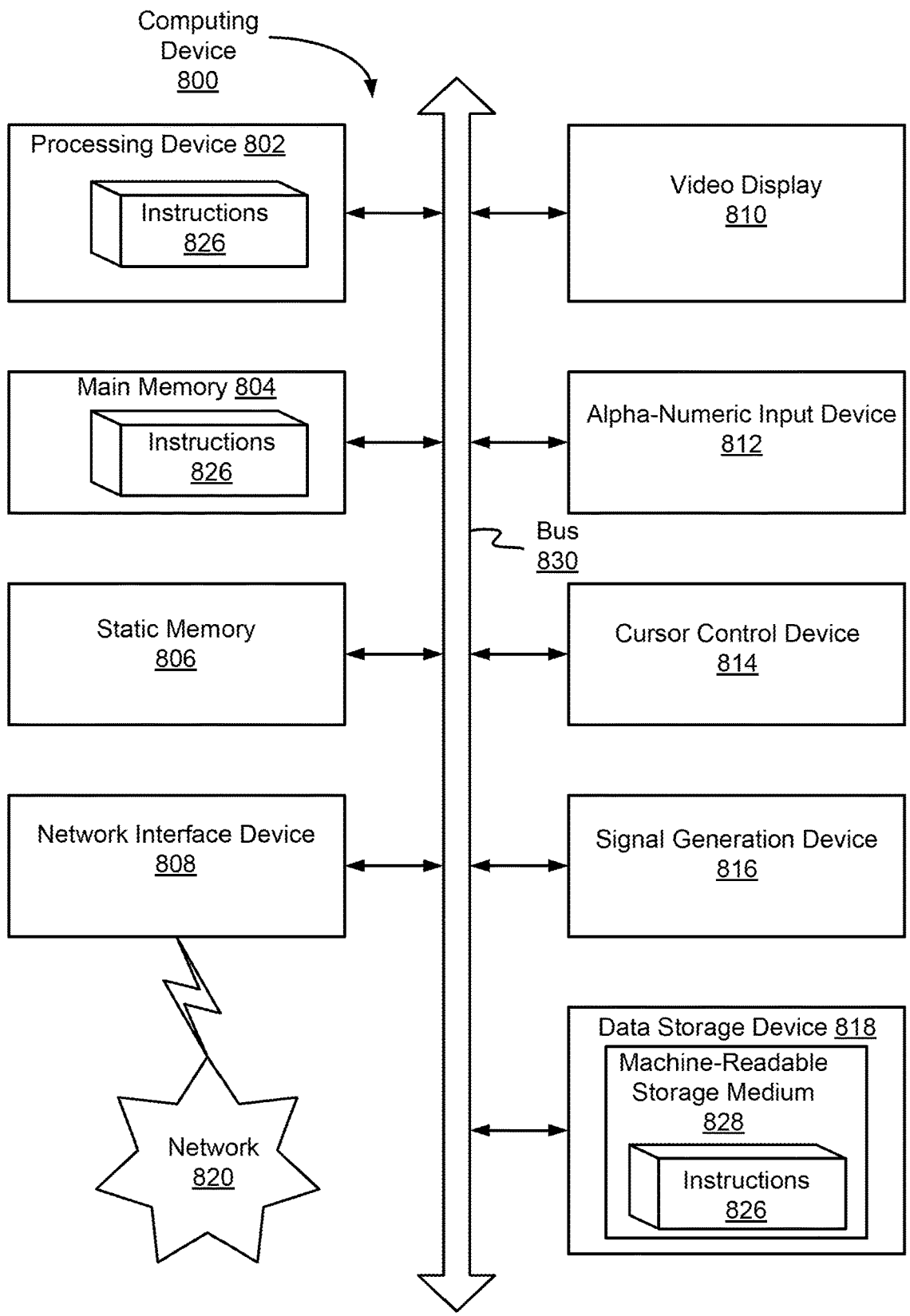
FIG. 8 is a schematic diagram of a machine in the example form of a computing device within which a set of instructions, for causing the machine to perform any one or more of the functions of the interactive video broadcasting service of FIG. 1 according to an implementation.

FIG. 8 is a diagrammatic representation of a machine in the example form of a computing device 800 within which a set of instructions, for causing the machine to perform any one or more of the functions of the interactive video broadcasting service 101 executing on the server computer 160 of FIG. 1. The computing device 800 may be a rackmount server, a server computer, or a mainframe computer, within which a set of instructions, for causing the machine to perform any one or more of the functions with respect to the interactive video broadcasting service 101 discussed herein. In some examples, the computing device 800 may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions of the interactive video broadcasting service 101 discussed herein.

In some examples, the computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

In some examples, processing device 802 represents one or more processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the functions and steps discussed herein.

In some examples, the computing device 800 may further include a network interface device 808 which may communicate with a network 820. In some examples, the network 820 may be the network 150 of FIG. 1. In some examples, the computing device 800 may be associated with a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In some examples, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. In some examples, the instructions may further be transmitted or received over the network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A system for streaming panoramic video in a social media environment, the system comprising:
at least one processor; and
a non-transitory computer-readable medium including executable instructions stored thereon, which when executed by at the least one processor are configured to:
execute a client application on a mobile computing device, the executed client application being configured to:
receive, over a network, a message regarding a live broadcast from a social media platform in response to the live broadcast being shared on the social media platform, wherein a user account associated with the client application executed on the mobile computing device is connected in a connection graph to a user account that shared the live broadcast, the connection graph storing relationships between user accounts of the social media platform;
join the live broadcast that is shared by the social media platform;
display a first portion of panoramic video of the live broadcast according to a first viewing angle on a display screen of the mobile computing device;
display a second portion of the panoramic video of the live broadcast according to a second viewing angle on the display screen, the second viewing angle providing a different perspective of the panoramic video than what was provided by the first viewing angle;
correlate a time of a user gesture taken with respect to the display screen on which the first or second portion of the panoramic video is displayed with a frame of the live broadcast, the user gesture including a tap on a portion of the display screen that includes the first or second portion of the panoramic video; and
provide, to the social media platform, an identifier corresponding to the user gesture, the correlated time being used by the social media platform to associate an engagement with a particular time in the live broadcast.

2. The system of claim 1, wherein the panoramic video includes 360-degree video data, and the client application is a mobile application installed on an operating system of the mobile computing device.

3. The system of claim 1, wherein the first viewing angle is determined based on information, detected via at least one internal sensor, that indicates a first physical orientation of the mobile computing device, wherein the second viewing angle is determined based on information, detected via the at least one internal sensor, that indicates a second physical orientation of the mobile computing device, wherein movement from the first physical orientation to the second physical orientation causes a viewing angle to change from the first viewing angle to the second viewing angle.

4. The system of claim 3, wherein the at least one internal sensor includes at least one of an accelerometer or a gyroscope.

5. The system of claim 1, wherein the executed client application is configured to:
trigger display of a first icon and a second icon on the display screen during a course of the live broadcast, the second icon being displayed after the first icon, the first icon representing a first engagement provided by a first viewing device streaming the panoramic video, the second icon representing a second engagement provided by a second viewing device streaming the panoramic video, the first engagement being associated with a first timestamp in the panoramic video such that the display of the first icon is triggered at a time indicated by the first timestamp, the second engagement being associated with a second timestamp in the panoramic video such that the display of the second icon is triggered at a time indicated by the second timestamp,
wherein the first icon disappears from the display screen when a predetermined interval elapses after the time indicated by the first timestamp, and the second icon disappears from the display when a predetermined interval elapses after the time indicated by the second timestamp.

6. The system of claim 1, wherein the panoramic video is received at the social media platform from a broadcasting device, the broadcasting device including a broadcasting client configured to enable the broadcasting device to communicate directly with the social media platform, the broadcasting client defining at least one of an application programming interface (API) or software development kit (SDK).

7. The system of claim 1, wherein the executed client application is configured to broadcast a live video stream to a plurality of viewing devices via the social media platform, the executed client application configured to:
determine a throughput between the mobile computing device and a server computer, the throughput representing a bandwidth available to transmit the live video stream to the server computer; and
reduce a video quality of the live video stream sent to the server computer in response to the throughput being below a threshold level such that the video quality for all viewing devices is set based on the bandwidth available to the mobile computing device.

8. The system of claim 1, wherein the executed client application is configured to:
receive the panoramic video from the social media platform;
display a first slice of the panoramic video according to the first viewing angle; and
display a second slice of the panoramic video according to the second viewing angle.

9. The system of claim 1, wherein the engagement is configured to be rendered as a movable display icon on a viewing device within a latency period of two seconds or less from the correlated time.

10. The system of claim 1, wherein the engagement includes a signal of appreciation.

11. A method for streaming panoramic video in a social media environment, the method comprising:
receiving, by a client application executed on a mobile computing device, a message regarding a live broadcast of an event, over a network, from a social media platform in response to the live broadcast being shared on the social media platform, wherein a user account associated with the client application executed on the mobile computing device is connected in a connection graph to a user account that shared the live broadcast, the connection graph storing relationships between user accounts of the social media platform;

joining the live broadcast that is shared by the social media platform;

displaying, by the client application, a first portion of panoramic video of the live broadcast according to a first viewing angle on a display screen of the mobile computing device, the first viewing angle being determined based on information, detected via at least one internal sensor, that indicates a first physical orientation of the mobile computing device;

displaying, by the client application, a second portion of the panoramic video of the live broadcast according to a second viewing angle on the display screen, the second viewing angle providing a different perspective of the panoramic video than what was provided by the first viewing angle, the second viewing angle being determined based on information, detected via the at least one internal sensor, that indicates a second physical orientation of the mobile computing device, wherein movement from the first physical orientation to the second physical orientation causes a viewing angle to change from the first viewing angle to the second viewing angle;

correlating a time of a user gesture taken with respect to the display screen on which the first or second portion of the panoramic video is displayed with a frame of the live broadcast, the user gesture including a tap on a portion of the display screen that includes the first or second portion of the panoramic video; and providing, to the social media platform, an identifier corresponding to the user gesture, the correlated time being used by the social media platform to associate an engagement with a particular time in the live broadcast.

12. The method of claim 11, further comprising:

broadcasting, by the client application, a live video stream to a plurality of viewing devices via the social media platform;

determining, by the client application, a throughput between the mobile computing device and a server computer, the throughput representing a bandwidth available to transmit the live video stream to the server computer; and reducing, by the client application, a video quality of the live video stream sent to the server computer in response to the throughput being below a threshold level such that the video quality is set for all viewing devices based on the bandwidth available to the mobile computing device.

13. The method of claim 11, further comprising:

triggering, by the client application, display of a first icon and a second icon on the display screen during a course of the live broadcast, the second icon being displayed after the first icon, the first icon representing a first engagement provided by a first viewing device streaming the panoramic video, the second icon representing a second engagement provided by a second viewing device streaming the panoramic video, the first engagement being associated with a first timestamp in the panoramic video such that the display of the first icon is triggered at a time indicated by the first timestamp, the second engagement being associated with a second timestamp in the panoramic video such that the display of the second icon is triggered at a time indicated by the second timestamp, wherein the first icon starts to fade when a predetermined interval elapses after the time indicated by the first timestamp, and the second icon starts to fade when a predetermined interval elapses after the time indicated by the second timestamp.

14. The method of claim 11, wherein the panoramic video is captured by a camera device, the camera device being connected to the mobile computing device via a wireless connection, the camera device including a broadcasting client configured to enable the camera device to communicate directly with the mobile computing device, the broadcasting client defining at least one of an application programming interface (API) or software development kit (SDK), wherein the mobile computing device receives the panoramic video from the camera device via the wireless connection, wherein the social media platform receives the panoramic video from the mobile computing device over the network.

15. The method of claim 14, wherein the broadcasting client is configured to be downloaded from an interactive video broadcasting service of the social media platform.

16. A non-transitory computer-readable medium storing executable instructions that when executed by at least one processor are configured to cause the at least one processor to:

receive, at a social media platform, panoramic video of a live broadcast, over a network, from a camera device or a mobile computing device connected to the camera device, the panoramic video including 360-degree video;

transmit, by the social media platform, a message regarding the live broadcast, over the network, to a client application executed on the mobile computing device in response to the live broadcast being shared on the social media platform, wherein a user account associated with the client application executed on the mobile computing device is connected in a connection graph to a user account that shared the live broadcast, the connection graph storing relationships between user accounts of the social media platform;

receive an indication that the user account associated with the client application executed on the mobile computing device has joined the live broadcast;

stream, over the network, a first portion of the panoramic video of the live broadcast to be displayed by the client application on a display screen of the mobile computing device;

stream, over the network, a second portion of the panoramic video of the live broadcast to be displayed by the client application on the display screen of the mobile computing device; and receive information about an engagement with the panoramic video from the client application, the information including a time of a user gesture that is correlated with a frame of the live broadcast, the user gesture being taken with respect to the display screen on which the first or second portion of the panoramic video is displayed, the user gesture including a tap on a portion of the display screen that includes the first or second portion of the panoramic video, the information including an identifier corresponding to the user gesture, the time being used by the social media platform to associate the engagement with a particular time in the live broadcast.

* * * * *